July 23, 1929.  R. W. ANSELM  1,721,613
WINDOW WIPER
Filed April 27, 1927
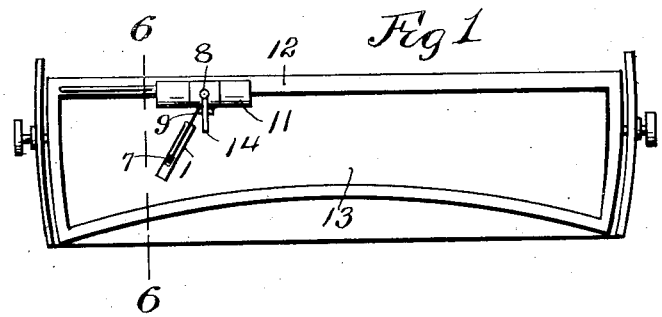
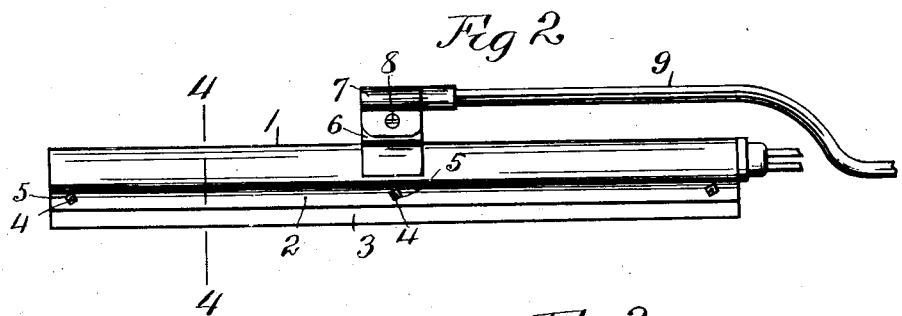
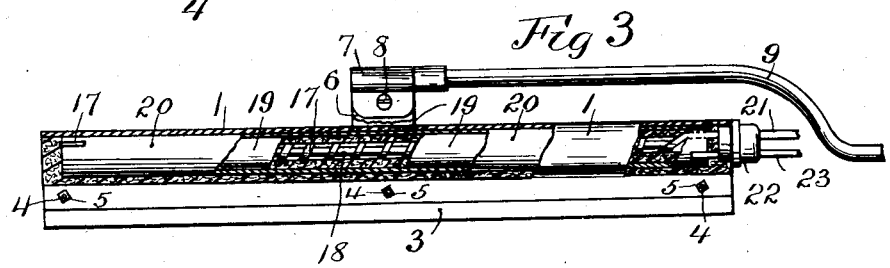
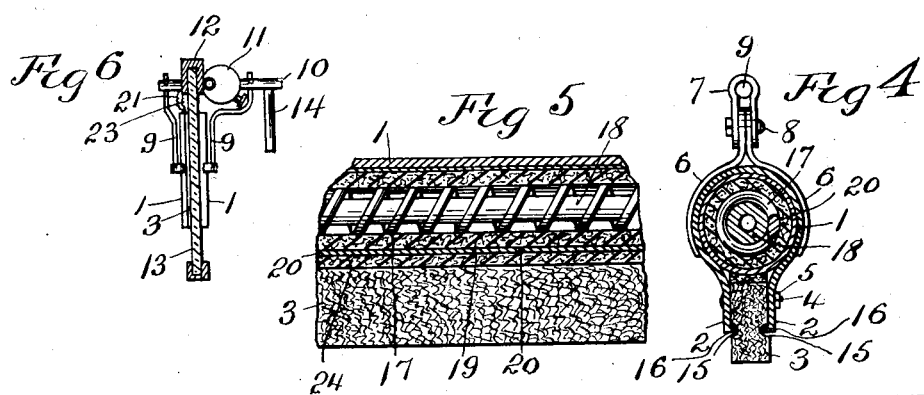
Witness
H. V. Olson
INVENTOR.
Roy W. Anselm.
BY Warren D. House,
His ATTORNEY.

Patented July 23, 1929.

1,721,613

UNITED STATES PATENT OFFICE.

ROY W. ANSELM, OF KANSAS CITY, MISSOURI.

WINDOW WIPER.

Application filed April 27, 1927. Serial No. 186,918.

My invention relates to improvements in window wipers.

It is particularly well adapted for use as a wiper for automobile wind shields.

One of the objects of my invention is to provide a novel window wiper which will melt the ice or frost which may accumulate on a window or wind shield on the surface thereof over which the squeegee of the wiper is adapted to travel.

A further object of my invention is to provide a novel wiper of the kind described, which is simple, cheap, durable, not liable to get out of order, which will reliably clear the surface operated upon of ice or frost, which is adapted for ready embodiment in window wipers of a type in common use, and which is efficient in operation.

The novel features of my invention are hereinafter fully described and claimed.

In the accompanying drawing, which illustrates the preferred embodiment of my invention, as applied to a wind shield, Fig. 1 is a reduced rear elevation of a wind shield provided with my improvement.

Fig. 2 is an enlarged side elevation, partly broken away of my improved wiper.

Fig. 3 is a view partly in side elevation and partly in vertical section, and partly broken away of what is shown in Fig. 2.

Fig. 4 is an enlarged section on the line 4—4 of Fig. 2.

Fig. 5 is an enlarged longitudinal sectional view of a portion of the squeegee holder and parts adjacent thereto.

Fig. 6 is a section on the line 6—6 of Fig. 1.

Similar reference characters designate similar parts in the different views.

1 designates a tubular holder having a longitudinal slot and two parallel flanges 2 at opposite sides respectively of the slot. 3 designates a squeegee, which may be of any suitable material, such as felt, and which is removably fitted between the flanges 2. Transverse bolts 4 extending through the flanges 2 and squeegee 3, and provided with nuts 5, serve to clamp the flanges 2 to the felt 3. This construction provides an adjustable means of clamping the felt 3 between the flanges 2, that enables the drawing closer of the flanges when the felt becomes set, or loses its resiliency.

The holder 1 is provided at its middle portion at the side opposite the flanges 2, with two ears 6 disposed between a clip 7 to which they are pivoted by a transverse screw 8. The clip is fastened to the outer end of a rod 9, the other end of which is fastened in a horizontal transverse rock shaft 10, which is mounted in a suitable housing, such as a hollow cylinder 11, which is fastened by any suitable means to the upper portion of wind shield frame 12, having mounted in it the usual glass plate 13. The latter is provided with a transverse hole, as is the frame 12, through which the rock shaft 10 extends. The rock shaft 10 at the inner side of the wind shield is provided with a crank 14, by which the rock shaft may be oscillated, so as to provide the squeegee 3 with an oscillating rubbing contact with the side of the glass 13 against which the squeegee bears.

As shown in Figs. 1 and 6, two squeegees may be disposed respectively at the inner and outer sides of the glass 13, if desired, the two holders 1 for the squeegees being supported by two rods 9 mounted in the rock shaft 10 at opposite sides respectively of the glass.

Each squeegee 3 may be provided in its opposite sides respectively with two slots 15, which respectively receive inwardly turned flanges 16 at the outer edges of the flanges 2, Fig. 4.

For heating the squeegee 3, and also for heating the surface of the glass 13 with which the squeegee has traveling engagement, there is mounted in the holder 1 a heating element, preferably electrical, which is disposed adjacent to and adapted to heat the squeegee.

The heating element may comprise the following described parts.

A conductive resistance wire coil 17 encircles a non-conductive core, which may comprise a longitudinal procelain tube 18. The wire coil 17 and the tube 18 are encircled by insulation 19, which may be asbestos. This asbestos casing 19 is mounted in a longitudinal metal tube 20, which is mounted in the holder 1.

One end of the resistance wire 17 is fastened to one end of the tube 20, and the other end of the wire 17 is fastened to a conductor 21, which extends through a plug 22 of non-conductive material, such as hard rubber. The adjacent end of the tube 20 is fastened to a conductor 23, which extends through the plug 22.

Interposed between the tube 20 and the felt 3 may be placed a strip of asbestos 24, which serves to protect the felt from a too intense heat, and also keeps moisture from passing from the felt to the tube 20, Fig. 5.

The ends of the holder 1 may be filled with asbestos, to prevent moisture passing into the holder at the ends thereof.

In the operation of the invention an electric current from a suitable source, not shown, passing through the conductor 21 will travel through the resistance coil 17, thereby highly heating the same, and will pass from the coil to the tube 20 and thence through the conductor 23 back to the source of the current.

The hot coil 17 will heat the tube 20 and will also heat the felt squeegee 3 sufficiently to melt ice or frost with which the squeegee contacts, and will also heat the surface of the glass 13 over which the squeegee travels.

By oscillating the rock shaft 10, in any suitable manner, as by the crank 14, which is at the inner side of the wind shield, the squeegee 3 is caused to have an oscillating rubbing contact with the glass 13, thereby sweeping from the surface with which the squeegee contacts, the water which is on such surface, due to the melting of the ice or frost, or which may be deposited thereon by rain or condensation.

If desired the rock shaft 10 may be automatically oscillated by any known means.

I do not limit my invention to the structure shown and described, as many modifications, within the scope of the appended claims may be made without departing from the spirit of my invention.

What I claim is:

1. In a window wiper, a tubular holder having a longitudinal slot and two longitudinal flanges projecting at opposite sides respectively of said slot, a heating element in said holder, a squeegee having its opposite sides respectively engaged by said flanges, and means connecting said flanges by which the squeegee is held clamped by said two flanges.

2. In a window wiper, a tubular holder having a longitudinal slot and two longitudinal flanges projecting at opposite sides respectively of said slot, a heating element in said holder, a squeegee having its opposite sides respectively engaged by said flanges, and adjustable means connecting said flanges by which the squeegee is held clamped with an adjustable pressure by said two flanges.

In testimony whereof I have signed my name to this specification.

ROY W. ANSELM.